United States Patent [19]

Hanlon et al.

[11] Patent Number: 4,524,829
[45] Date of Patent: Jun. 25, 1985

[54] METHOD OF ALTERING THE PERMEABILITY OF A SUBTERRANEAN FORMATION

[75] Inventors: David J. Hanlon; Stephen W. Almond, both of Duncan, Okla.

[73] Assignee: Halliburton Company, Duncan, Okla.

[21] Appl. No.: 652,419

[22] Filed: Sep. 19, 1984

Related U.S. Application Data

[63] Continuation of Ser. No. 525,596, Aug. 23, 1983, abandoned.

[51] Int. Cl.$^3$ .................... C09K 3/00; E21B 43/22; E21B 43/25
[52] U.S. Cl. ................. 166/294; 252/8.55 D; 166/270; 166/273; 166/274; 166/275; 166/295; 523/130; 523/131
[58] Field of Search ............ 252/8.55 D; 166/270, 166/273, 274, 275, 294, 295; 523/130, 131

[56] References Cited

U.S. PATENT DOCUMENTS

| | | | |
|---|---|---|---|
| 3,638,729 | 2/1972 | Parker | 166/273 |
| 3,658,129 | 4/1972 | Lanning et al. | 166/270 |
| 3,667,546 | 6/1972 | Parker | 166/274 |
| 3,707,191 | 12/1972 | Parker | 166/275 |
| 3,724,548 | 4/1973 | Parker et al. | 166/275 |
| 3,727,687 | 4/1973 | Clampitt et al. | 166/294 |
| 3,740,360 | 6/1973 | Nimerick | 523/131 |
| 3,749,172 | 7/1973 | Hessert et al. | 166/274 |
| 3,757,863 | 9/1973 | Clampitt et al. | 166/307 |
| 3,762,476 | 10/1973 | Gall | 166/294 |
| 3,782,467 | 1/1974 | Hessert | 166/261 |
| 3,785,437 | 1/1974 | Clampitt et al. | 166/294 |
| 3,833,061 | 9/1974 | Gall | 166/294 |
| 3,844,348 | 10/1974 | Stratton | 166/294 |
| 3,845,822 | 11/1974 | Clampitt et al. | 166/294 |
| 3,848,673 | 11/1974 | Clampitt et al. | 166/275 |
| 3,881,552 | 5/1975 | Hessert | 166/294 |
| 3,884,861 | 5/1975 | Whitworth et al. | 260/29.3 |
| 3,887,506 | 6/1975 | Hewitt | 260/17 A |
| 3,900,406 | 8/1975 | Clampitt et al. | 252/8.55 D |
| 3,908,760 | 9/1975 | Clampitt et al. | 166/294 |
| 3,909,423 | 9/1975 | Hessert et al. | 252/8.55 D |
| 3,910,350 | 10/1975 | Mastroianni | 166/274 |
| 3,926,258 | 12/1975 | Hessert et al. | 166/294 |
| 3,949,811 | 4/1976 | Threlkeld et al. | 166/294 |
| 3,952,806 | 4/1976 | Trantham | 166/294 |
| 3,955,998 | 5/1976 | Clampitt et al. | 106/193 R |
| 3,964,923 | 6/1976 | Zetmeir | 106/189 |
| 3,971,440 | 7/1976 | Hessert et al. | 166/270 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,040,484 | 8/1977 | Hessert | 166/294 |
| 4,043,921 | 8/1977 | Hessert et al. | 252/8.55 D |
| 4,048,079 | 9/1977 | Clampitt et al. | 252/8.55 D |
| 4,061,580 | 12/1977 | Jahnke | 252/8.55 R |
| 4,110,226 | 8/1978 | Swanson | 252/8.55 D |
| 4,110,230 | 8/1978 | Hessert et al. | 252/8.55 D |
| 4,110,231 | 8/1978 | Swanson | 252/8.55 D |
| 4,120,361 | 10/1978 | Threlkeld et al. | 166/294 |
| 4,250,042 | 2/1981 | Higgins | 252/8.5 C |
| 4,313,834 | 2/1982 | Harris | 252/8.55 C |
| 4,324,668 | 4/1982 | Harris | 252/8.55 C |
| 4,366,073 | 12/1982 | McLaughlin et al. | 252/8.55 R |
| 4,392,964 | 7/1983 | House et al. | 252/8.5 C |
| 4,460,751 | 7/1984 | Hanlon et al. | 525/371 |

FOREIGN PATENT DOCUMENTS 61685  10/1982  European Pat. Off. ....... 252/8.55 D

*Primary Examiner*—Paul Lieberman
*Assistant Examiner*—Robert A. Wax
*Attorney, Agent, or Firm*—Thomas R. Weaver; Edward F. Sherer

[57] ABSTRACT

The production of water from a subterranean formation is reduced by contacting the formation with a water dispersible hydrophilic organic polymer having a molecular weight greater than 100,000 and containing carboxyl functionality and a crosslinking composition comprising water, a zirconium compound having a value of 4+, an alpha-hydroxy acid and an amine compound.

20 Claims, No Drawings

METHOD OF ALTERING THE PERMEABILITY OF A SUBTERRANEAN FORMATION

This application is a continuation of application Ser. No. 525,596, filed Aug. 23, 1983, now abandoned.

BACKGROUND OF THE INVENTION

1. Field of the Invention:

This invention relates to a method of treating a subterranean formation of non-uniform permeability, and more particularly concerns a method of reducing the permeability of subterranean formations to water thereby promoting better control of fluid injection patterns in the secondary or tertiary recovery of hydrocarbons and achieving water reduction in producing wells and thus reducing the quantity of water recovered from a subterranean formation penetrated by a well bore whereby the relative production rate of the hydrocarbons is increased.

2. Description of the Prior Art:

Since only a portion of the oil contained in a subterranean reservoir can be recovered by primary methods, it has become general practice to employ various secondary or tertiary recovery techniques to produce the additional quantities of oil not economically recovered by primary methods. Of the various secondary or tertiary recovery methods available, one of the most widely practiced techniques is the displacement of oil from the reservoir with a driving fluid such as a floodwater injected for that purpose. Normally, in carrying out the flooding process, input or injection wells are utilized. These wells can be old existing wells or can be wells which are newly drilled into the oil-producing strata. The injection wells locations with reference to the production wells are selected to afford a desired flood pattern, the selected pattern depending in part upon field conditions, the locations of existing wells, and the operator's preference. Aqueous drive fluids, such as water, brine, or a viscous aqueous fluid are forced into the input wells under pressure, and out into the surrounding oil bearing strata towards the producing well or wells. While waterflooding has been rather widely practiced in recent years, it is not without considerable operating problems and economical limitations particularly those associated with low oil recoveries in proportion to the amount of water injected. Various surfactant and solvent floods have been proposed as means for recovering additional quantities of oil over that recoverable by conventional waterflooding. However, these processes face serious operating problems when practiced in heterogeneous formations containing strata or channels having permeability substantially higher than the bulk of the formation.

One of the major problems encountered in a flooding operation is the breakthrough of the flooding medium from the flood front to the producing well relatively early in the displacement process, and rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due in part to the peculiar structure of the oil-bearing strata. Underground oil reservoirs, in most cases, consist of layers of sand or rock and, since no reservoir rock is perfectly uniform in composition and structure, the permeability will vary across the rock face or strata. Also, fractures, cracks, and other abnormalities can promote channeling of the displacement of the fluid.

In the normal flooding operation, maximum oil recovery is obtained when the driven fluid goes up in a wide bank in front of the driving fluid which moves uniformly towards the producing well. To keep this bank of oil intact and constantly moving towards the producing well, a substantially uniform permeability must exist throughout the strata. If this uniform permeability does not exist, or is not provided, the flooding fluid will seek the areas of high permeability, and channeling occurs with the subsequent loss of some driving fluid energy and the appearance of excessive amounts of driving fluid in the producing well. Moreover, as the more permeable strata are depleted, the driving fluid has a tendency to follow channels and further increase the consumption of the flooding medium to the point where the process becomes uneconomical. It is, therefore, desirable to operate at a drive fluid to oil ratio that is as low as possible.

Another problem associated with the production of oil from oil-bearing formations containing highly permeable water channels communicating the production well with the water zone is the intrusion of water into the well. Not only does this water intrusion cause production and disposal problems, but more importantly the beneficial effect of the natural water drive is at least, in part, lost thereby adversely affecting oil recovery.

It is advantageous to reduce the permeability of the water channels so as to render the formation more uniformly permeable and to increase the unit efficiency of the water drive, or alternatively to shut off the water intrusion.

Many processes have been proposed for reducing the permeability of a subterranean formation. For instance, U.S. Pat. No. 3,762,476 discloses that the quantity of water recovered from a subterranean formation penetrated by a well bore can be reduced by injecting into the subterranean formation a first thickened aqueous solution, a complexing ionic solution of multivalent cations and retarding anions, a brine slug, and a second thickened aqueous solution. Complexing ionic solutions disclosed in the patent have a multivalent metal cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$ and a retarding anion selected from the group consisting of acetate, nitrilotriacetate, tartrate, citrate and phosphate.

U.S. Pat. No. 3,833,061 discloses a method for selectively reducing the permeability of an oil-wet subterranean formation penetrated by at least one well bore by passing an oxidizing agent through and into contact with the formation for oxidizing and removing hydrocarbons from the surfaces of the formation and thereafter contacting the treated formation surfaces with a crosslinked polymer. The patent discloses the use of aluminum citrate as a crosslinking composition.

By the present invention, compositions are provided which are very effective in reducing the permeability to water of a subterranean formation. Methods of forming the compositions in treating the subterranean formation therewith are also provided.

SUMMARY OF THE INVENTION

The method of the present invention resides in a method for reducing the permeability of a subterranean formation penetrated by at least one well bore by treating the formation surfaces with a crosslinked polymer. The method of the invention can be used in either injection wells of water floods or hydrocarbon production wells for the purpose of reducing the water-oil ratio produced therefrom, e.g., reduce the mobility of water in the wellbore area.

In one embodiment of the present invention, the permeability of the subterranean formation is altered by contacting the formation with an aqueous mixture comprising a water dispersible hydrophilic organic polymer having a molecular weight greater than 100,000 and containing carboxyl functionality and a crosslinking composition comprising:

(a) water;
(b) a zirconium compound having a valence of 4+ and selected from the group consisting of zirconium oxychloride, zirconium acetate, zirconium tetrachloride, zirconium ortho-sulfate, zirconium carbonate, zirconium ammonium carbonate, and mixtures thereof;
(c) an alpha-hydroxy acid represented by the following formula:

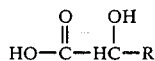

wherein R is selected from the group consisting of hydrogen and an alkyl group having 1 to about 3 carbon atoms;
(d) an amine compound represented by the formula:

wherein
$R_1$ is an hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms; and,
$R_3$ is selected from the group consisting of hydrogen, an alkyl group having 1 to about 3 carbon atoms and a hydroxyalkyl group having 1 to about 3 carbon atoms.

In another embodiment of the present invention, the subterranean formation is contacted sequentially with a first mixture comprising water and a water dispersible hydrophilic organic polymer having a molecular weight greater than 100,000 and containing carboxyl functionality, optionally a spacer fluid, an aqueous crosslinking composition comprising:

(a) water;
(b) a zirconium compound having a valence of 4+ and selected from the group consisting of zirconium oxychloride, zirconium acetate, zirconium ortho-sulfate, zirconium tetrachloride, zirconium carbonate, zirconium ammonium carbonate, and mixtures thereof;
(c) an alpha-hydroxy acid represented by the following formula:

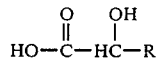

wherein

R is selected from the group consisting of hydrogen and alkyl group having 1 to about 3 carbon atoms
(d) an amine compound represented by the formula:

wherein
$R_1$ is hydroxyalkyl group having 1 to about 3 carbon atoms:
$R_2$ is selected from the group consisting of an alkyl group having 1 to about 3 carbon atoms and a hydroxyalkyl group having 1 to about 3 carbon atoms; and,
$R_3$ is selected from the group consisting of hydrogen, an alkyl group having 1 to about 3 carbon atoms and a hydroxyalkyl group having 1 to about 3 carbon atoms; and, finally with a second mixture comprising water and a hydrophilic organic polymer having a molecular weight greater than 100,000 and containing carboxyl functionality.

The use of the method of the invention results in a reduction in permeability of the subterranean formation.

DESCRIPTION OF THE PREFERRED EMBODIMENTS

Polymers suitable for use in the present invention can generally be described as water dispersible hydrophilic organic polymers having a molecular weight greater than 100,000 and containing carboxyl functionality whereby the polymers can be crosslinked with zirconium compounds having a valence of +4. Examples of such polymers include carboxyalkyl guar wherein the alkyl group has 1 to about 3 carbon atoms, carboxyalkylhydroxyalkyl guar wherein the alkyl groups have 1 to about 3 carbon atoms, xanthan gum, polyacrylamide and polymethacrylamide wherein from about 5 to about 75 percent of the carboxylamide groups of the polyacrylamide and polymethacrylamide are hydrolyzed to carboxyl groups, cellulose ether polymers containing carboxyl functionality, and copolymers resulting from the polymerization of acrylamide or methacrylamide with acrylic acid and/or methacrylic acid.

The polymers used in the present invention are preferably substantially free of crosslinking between the polymer chains. As used herein and in the claims, unless otherwise specified, the term "hydrolyzed" includes modified polymers wherein the carboxyl groups are in the acid form and also polymers wherein the carboxyl groups are in the salt form, provided such salts are water dispersible. Such salts include ammonium salts, alkali metal salts, and others which are water dispersible. Hydrolysis can be carried out in any suitable fashion, for example, by heating an aqueous solution of the polymer with a suitable amount of sodium hydroxide.

Examples of cellulose ethers which can be used to carry out the invention include, for example, carboxyalkyl cellulose ethers such as carboxymethyl cellulose (CMC), and mixed ethers such as carboxyalkylhydroxyalkyl cellulose ethers such as carboxymethylhydroxyethyl cellulose (CMHEC). Many of these cellulose ethers that contain carboxyl functionality are commercially available and are available as the alkali metal salt, usually the sodium salt. The metal is seldom referred to and they are commonly referred to as CMC or CMHEC.

The copolymers of acrylic acid, methacrylic acid or combinations thereof with acrylamide, methacrylamide or combinations thereof are made up with from about 5 to 70 percent by weight of acrylic acid, methacrylic acid and combinations thereof and most preferably from about 10 to about 40 percent by weight of acrylic acid, methacrylic acid and combinations thereof.

Included among the polyacrylamides that can be used in the present invention are polyacrylamides and related polymers which are water soluble. Presently preferred polymers include homopolymers and copolymers of acrylamide and methacrylamide. These polymers can contain from about 5 percent to about 75 percent and preferably about 40 percent of the carboxamide groups hydrolyzed to carboxyl groups.

The most preferred polymer for carrying out the method of the invention is polyacrylamide wherein 7 percent or 30 percent of the carboxamide groups are hydrolyzed to carboxyl groups. The amount of carboxyl functionality will depend on the formation to be treated.

Mixtures of the above-described polymers can be used in the practice of the invention.

The polymers must have a molecular weight of at least 100,000, but the upper limit of the molecular weight is not critical as long as the polymer is water dispersible and the aqueous gel prepared therefrom can be pumped. Thus, polymers having a molecular weight as high as 20 million or higher, in many said conditions can be used.

The amount of the polymers used in the practice of the invention can vary widely depending on the particular polymer desired, purity of the polymer, and the properties desired in the gels. Generally speaking, amounts in the range of from 0.0025 to about 5.0, preferably from 0.01 to 1.5, or preferably 0.025 to about 0.4 weight percent based on the weight of water can be used. Amounts outside this range, however, can be used. Small amounts of polymer will usually produce liquid mobile gels which can be readily pumped where as large amounts of polymer will usually produce thick, viscous, some what elastic gels. The thick gels can be thinned by the dissolution of water to any desired concentration of polymer and this can be done by mechanical means such as stirring, pumping, or by means of a suitable turbulence inducing device to cause shearing such as a jet nozzle. Thus, there is really no fixed upper limit on the amount of polymer which can be used.

The crosslinking composition which is used in the practice of the invention comprises
(a) water;
(b) a zirconium compound selected from the group consisting of zirconium oxychloride, zirconium acetate, zirconium ortho-sulfate, zirconium tetrachloride, zirconium carbonate, zirconium ammonium carbonate, and mixtures thereof;
(c) an alpha-hydroxy acid represented by the following formula:

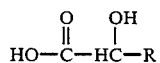

wherein R is selected from the group consisting of hydrogen and alkyl group having 1 to about 3 carbon atoms;

(d) an amine compound represented by the formula:

wherein
$R_1$ is hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms; and,
$R_3$ is selected from the group consisting of hydrogen, an alkyl group having 1 to about 3 carbon atoms and a hydroxyalkyl group having 1 to about 3 carbon atoms.

The preferred zirconium compound used to carry out the present invention is zirconium oxychloride.

Examples of suitable alpha-hydroxy acids which can be utilized in the present invention include lactic acid and glycolic acid. The preferred alpha-hydroxy acid is lactic acid.

Examples of suitable amines compounds which can be utilized in the present invention include diethanolamine, triethanolamine, and dimethylethanolamine. The preferred amine is triethanolamine.

At elevated temperatures, it is sometimes desirable that the crosslinking composition be delayed for longer periods of time than the above-described crosslinking composition. When those instances occur, citric acid or malic acid can be added to the above-described crosslinking composition.

The zirconium compound used in the crosslinking composition has a +4 valence. Although the crosslinking mechanism is not totally understood, it is believed that the valence of the zirconium compound does not change during the crosslinking of the composition with the polymers.

While it is not intended to limit the invention by any theories as to the nature of the mechanisms, it is presently believed that amine and acid used in the crosslinking composition complexes with, chelates, or otherwise reacts with the zirconium ions having a valence of +4. It is believed that amine and acid are thus in competition with the polymers and temporarily reduce the number of ions available for reaction with the polymer and thus delays the crosslinking reaction.

The quantity of zirconium compound having a valence of +4, acid, and amine used in the crosslinking composition of the present invention will vary over a wide range. Generally, about 1 mole of zirconium metal ion is used with about 2 to about 5 moles of the alpha-hydroxy acid and about 1 to 5 moles of the amine. When citric acid or malic acid is used in the crosslinking composition, which can further delay the crosslinking reaction, from about 0.25 moles to about 2 moles are utilized with 1 mole of zirconium metal ion. A particularly preferred crosslinking composition comprises zirconium oxychloride in an amount sufficient to produce one mole of zirconium metal ion having a valence of +4, about 2 moles of lactic acid, and about 2 moles of triethanolamine. When it is desired to add citric acid or malic acid to the crosslinking composition, preferably about 0.25 moles are added.

The amount of crosslinking composition used to carry out the method of the invention will vary over a wide range and therefore the amounts will vary according to the formation to be treated. Preferably, however, good results have been achieved when the crosslinking composition is employed in amounts of from about 1.0 to about 100.0, more preferably, from about 2.0 to about 50.0 percent by weight of the total polymer.

The crosslinking composition is prepared preferably by adding to an amount of water which is sufficient to allow sufficient mixing of ingredients of the crosslinking composition the alpha-hydroxy acid and adjusting the pH of the acid mixture from about 5 to about 8, and preferably 7, with a basic compound such as sodium hydroxide or preferably ammonium hydroxide to form a first mixture. The zirconium compound, when zirconium oxychloride, zirconium acetate, zirconium orthosulfate and zirconium tetrachloride are utilized, is preferably the next ingredient added to the first mixture to form a second mixture. Finally the amine compound is preferably added to the second mixture containing the zirconium compound to form a third mixture. The pH of the second mixture can be adjusted using a basic compound such as sodium hydroxide or preferably ammonium hydroxide or the pH of the second mixture can be adjusted by the addition of the amine compound. Although the crosslinking composition can be used at a pH greater than 8 or less than 5, it is important that the mixing of the first and second mixtures be carried out at a pH from about 5 to about 8, and preferably at about 7. When citric acid or malic acid is utilized in the crosslinking composition, it is added to the third mixture after the pH has been adjusted from about 5 to about 8.

When zirconium carbonate or zirconium ammonium carbonate is utilized in the crosslinking composition, the crosslinking composition is preferably prepared by first adding the zirconium carbonate or the zirconium ammonium carbonate to water to form a first mixture, next adding the amine compound to the first mixture to form a second mixture, and adjusting the pH of the second mixture from about 5 to about 8, usually with an acid such as hydrochloric acid, and, finally adding the alpha-hydroxy acid to the second mixture to form a third mixture and adjusting the pH of the third mixture from about 5 to about 8.

The term "water" is used generally herein and in the claims, unless otherwise specified, to include brines and fresh water.

On some occasions, the surfaces of the formation to be treated are covered with materials such as hydrocarbons. If this covering is removed from the surface prior to the treatment, a treatment wherein the permeability of the formation is reduced is better achieved. Therefore, sometimes an agent is utilized which removes the hydrocarbons from the surfaces of the formation prior to the treatment. Agents which can be used include oxidizing agents such as hydrogen peroxide, potassium permanganate, nitric acid, and the like. These agents are well known in the art and the selection of the agent will depend on the formation to be treated.

The polymer solutions can be prepared in either freshwater or brine. Any suitable procedure for preparing the polymer solution can be used.

In one embodiment of the present invention, the mixture comprising water and the water dispersible hydrophilic organic polymers having a molecular weight greater than 100,000 and containing carboxyl functionality are mixed with the crosslinking composition and the resulting mixture is injected through a well into the subterranean formation. The mixture is directed to that portion of the subterranean formation where it is desired that the permeability be altered. After the injection of the above-described mixture, a spacer fluid is preferably injected into the well to displace the mixture from the tubing and out into the formation. Preferably the volume of the spacer fluid is the volume needed to displace all the treating fluids out in the formation plus five barrels per vertical foot of interval to be treated. The well is then preferably shut in for about 48 hours.

In another embodiment of the present invention, a first mixture comprising water and a water dispersible hydrophilic organic polymer having a molecular weight greater than 100,000 and containing carboxyl functionality is injected through a well into the subterranean formation whereby the polymer contacts the portion of the formation where the change in permeability is desired. Optionally, a spacer fluid such as a brine solution is next injected into the well and thus contacts the formation. After the spacer fluid injection is completed, the crosslinking compound containing the zirconium compound having a valence of $+4$, amine, and alpha-hydroxy acid is injected into the well bore and into the formation whereby the crosslinking composition contacts the polymer in the formation. Finally, a second mixture comprising water and a water dispersible hydrophilic organic polymer having a molecular weight greater than 100,000 and containing carboxyl functionality is injected into the well and into the formation. The steps of injecting the crosslinking composition and the second organic polymer can be repeated if necessary. This embodiment is used primarily for treating waterflood injection wells.

Spacer fluids that can be used in the present invention are well known in the art and include brine solutions, alkali metal halide solutions and the like.

The amount of total polymer used to carry out the method of the present invention will vary over a wide range depending upon the formation to be treated.

The invention is further exemplified by the examples below and they are presented to illustrate certain specific embodiments of the invention, but are not to be intended to be construed so as to be restrictive of the scope and spirit thereof.

EXAMPLE I

A series of aqueous gels were prepared using the crosslinking composition of the present invention and various polymers.

The crosslinking composition used in Tests 1 through 6 and 9 through 13 was prepared by adding the alpha-hydroxy acid to water to form a first mixture, and adjusting the pH of the first mixture to about 7, adding the zirconium compound to the first mixture to form a second mixture, and adding the amine to the second mixture to form a final mixture and adjusting the pH of the final mixture to about 7.

The crosslinking composition used in Test 7 was prepared by adding an aqueous solution of lactic acid to zirconium acetate to form a first mixture, heating the first mixture to about 110° F. for 10 minutes, adjusting the pH of the first mixture to about 6, and adding the amine to the first mixture to form a second mixture. The pH of the second mixture was checked to ensure a final pH of about 7.

The crosslinking composition used in Test 8 was prepared by adding zirconium carbonate to water to form a first mixture, adding triethanolamine to the first mixture to form a second mixture and adjusting the pH of the second mixture to about 7 with hydrochloric acid and adding lactic acid to the second mixture to form a third mixture and adjusting the pH of the third mixture to about 7.

The crosslinking composition was added to an aqueous polymer solution. The crosslinking composition and polymer were then mixed at ambient temperature except for Test 8.

The crosslinking of the polymer by the crosslinking composition was visually determined by observing at a specific time the increase in viscosity of the solution containing the crosslinking composition and the polymer.

The results of these tests are shown in Table I.

from Carter County, Okla. and were about 15/16" in diameter and about 2" in length.

The test was carried out by the following steps:

a. Pump through the cores a brine solution until a constant flow rate of 1 ml/min was achieved. The brine solution had the following composition:

| Salt | g/l |
|---|---|
| NaCl | 52.3 |
| $CaCl_2$ | 11.96 |
| $MgCl_2.6H_2O$ | 6.52 |
| $NaHCO_3$ | 0.45 | b. Pump through the cores at a constant flow rate of 1 ml/min an aqueous solution comprising 500 ppm of a copolymer of 90% by weight polyacrylamide and 10% by weight acrylic acid and 2% by weight of a

TABLE I

| Test No. | Crosslinking Compound Zirconium Compound (1 mole) | Alphahydroxy Acid (moles used) | Amine (moles used) | Polymer (% hydrolyzed) | Weight Ratio of Crosslinking Compound to Polymers | Gelling Time (Min.) | Remarks |
|---|---|---|---|---|---|---|---|
| 1 | Zirconium Oxychloride | lactic acid (2) | triethanolamine (1) | polyacrylamide (9%) | 140/2,000 | 40 | Stable gel without precipitate |
| 2 | Zirconium Oxychloride | lactic acid (2) | triethanolamine (2) | polyacrylamide (9%) | 100/2,500 | | Stable gel without precipitate |
| 3 | Zirconium Oxychloride | lactic acid (3) | triethanolamine (1) | polyacrylamide (9%) | 100/2,500 | 20 | Stable gel without precipitate |
| 4 | Zirconium Oxychloride | lactic acid (3) | diethanolamine (1) | polyacrylamide (9%) | 100/2,500 | 10 | Stable gel without precipitate |
| 5 | Zirconium Oxychloride | lactic acid (3) | dimethyl-ethanolamine (1) | polyacrylamide (9%) | 100/2,500 | 20 | Stable gel without precipitate |
| 6 | Zirconium Oxychloride | Glycolic Acid (3) | triethanolamine (1) | polyacrylamide (9%) | 100/2,500 | 15 | Stable gel without precipitate |
| 7 | Zirconium Acetate | lactic acid (3) | triethanolamine (1) | polyacrylamide (9%) | 100/2,500 | 15 | Stable gel without precipitate |
| 8 | Zirconium Carbonate | lactic acid (3) | triethanolamine (1) | polyacrylamide (9%) | 100/2,500 | 15–20* | Stable gel without precipitate |
| 9 | Zirconium Oxychloride | lactic acid (3) | triethanolamine (1) | carboxymethyl cellulose DS = 0.9 | 150/6,000 | 1 | Stable gel without precipitate |
| 10 | Zirconium Oxychloride | lactic acid (3) | triethanolamine (1) | carboxymethyl-hydroxyethyl cellulose DS = 0.4 MS = 2.0 | 150/6,000 | 10 | Stable gel without precipitate |
| 11 | Zirconium Oxychloride | lactic acid (3) | triethanolamine (1) | carboxymethyl-hydroxypropyl guar DS = 0.3 MS = 0.6 | 150/6,000 | 1 | Stable gel without precipitate |
| 12 | Zirconium Oxychloride | lactic acid (3) | triethanolamine (1) | hydroxypropyl guar MS = 0.4 | 150/6,000 | 2 | Stable gel without precipitate |
| 13 | Zirconium Oxychloride | lactic acid (3) | triethanolamine (1) | Xanthan | 100/5,000 | 2 | Stable gel without precipitate |

*Tests carried out at 180° F.

EXAMPLE II

A test was conducted to determine the residual resistance factor (RRF) of two cores using the method of the present invention. The cores were connected in series with one another and contained Healdton Sand crosslinking composition. The crosslinking composition comprised 1 mole of zirconium oxychloride, 3 moles of lactic acid, and 1 mole of triethanolamine. Eight pore volumes (based on the pore volume of both cores) of the aqueous solution were pumped through the cores.

c. Shut in the cores overnight.

d. Pumped a brine solution through the cores until a constant flow rate of 1 ml/min was achieved.

The results of this test were measured in residual resistance factor (RRF).

$$RRF = \frac{\text{permeability before treatment}}{\text{permeability after treatment}}$$

The permeabilities for the RRF were measured by the pumping pressure through the cores, before and after treatment.

The RRF after treatment for the first core leveled off at about 12.9 and the RRF leveled off for the second core, which was the second core connected in the series, to about 5.5.

EXAMPLE III

A test was conducted to determine the residual resistance factor (RRF) of two cores using the method of the present invention. The cores were connected in series with one another, contained standard Berea sandstone, and were about 15/16" in diameter and about 4" in length.

The test was carried out by the following steps:

a. Pump through the cores a brine solution until a constant flow rate of 1 ml/min. was achieved. The brine solution had the following composition:

| Salt | g/l |
|---|---|
| NaCl | 69.3 |
| CaCl$_2$ | 5.3 |
| MgCl$_2$.6H$_2$ | 4.0 | b. Pump through the cores at a constant flow rate of 1 ml/min. About 2.5 pore volumes (based on the pore volume of both cores) of an aqueous solution comprising 1,000 ppm of a polymer comprising 30 percent hydrolyzed polyacrylamide.

c. Pump through the cores at a constant flow rate of 1 ml/min one pore volume (based on the pore volume of both cores) of a brine solution. The brine solution had the same composition as the brine of Step a.

d. Pump through the cores, at a constant flow rate of 1 ml/min, 1.5 pore volume (based on the pore volume of both cores) of an aqueous solution comprising 500 ppm of a crosslinking composition. The crosslinking composition had the same ingredients and proportions as the crosslinking composition of Step b of Example II.

e. Pump through both cores, at a constant flow rate of 1 ml/min one pore volume (based on the pore volume of both cores) of a brine solution. The brine solution had the same compositon as the brine of Steps a and c.

f. Pump through the cores, at a constant flow rate of 1 ml/min. About 2.5 pore volumes (based on the pore volume of both cores) of an aqueous solution comprising 1,000 ppm of a polymer comprising 30 percent hydrolyzed polyacrylamide.

g. Shut in the cores overnight.

h. Pump a brine solution through the cores until a constant flow rate of 1 ml/min was achieved.

The results of the test were measured in residual resistance factor (RRF) in the same manner as Example II.

The RRF of the first core leveled off at about 22.5 and the RRF of the second core leveled off at about 3.8.

Although certain preferred embodiments of the invention have been herein described for illustrative purposes, it will be appreciated that various modifications and innovations of the procedures and compositions recited may be effected without departure from the basic principals which underlie the invention. Changes of this type are therefore deemed to lie within the spirit and scope of the invention except as may be necessarily limited by the amended claims or reasonable equivalents thereof.

What is claimed is:

1. A method of altering the permeability of a subterranean formation comprising contacting said formation with an aqueous mixture comprising:
   a. a water dispersible hydrophilic organic polymer having a molecular weight greater than 100,000 and containing carboxyl functionality; and
   b. a crosslinking composition comprising
      (1) water;
      (2) a zirconium compound selected from the group consisting of zirconium oxychloride, zirconium acetate, zirconium ortho-sulfate, zirconium tetrachloride, zirconium carbonate, zirconium ammonium carbonate, and mixtures thereof;
      (3) an alpha-hydroxy acid represented by the following formula:

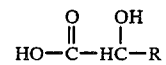

wherein R is selected from the group consisting of hydrogen and an alkyl group having about 1 to about 3 carbon atoms; and, (4) an amine compound represented by the formula:

wherein:
   R$_1$ is hydroxyalkyl group having 1 to about 3 carbon atoms;
   R$_2$ is selected from the group consisting of an alkyl group having 1 to about 3 carbon atoms and a hydroxyalkyl group having 1 to about 3 carbon atoms; and,
   R$_3$ is selected from the group consisting of hydrogen, an alkyl group having 1 to about 3 carbon atoms and a hydroxyalkyl group having 1 to about 3 carbon atoms.

2. The method recited in claim 1 wherein said water dispersible organic polymer is selected from the group consisting of carboxyalkyl guar wherein the alkyl group has 1 to about 3 carbon atoms, carboxyalkylhydroxyalkyl guar wherein the alkyl groups have 1 to about 3 carbon atoms, xanthan gum, polyacrylamide wherein about 5 to about 75 percent of the carboxamide groups are hydrolyzed to carboxyl groups, polymethacrylamide wherein about 5 to about 75 percent of the carboxamide groups are hydrolyzed to carboxyl groups, cellulose ethers, a copolymer of about 5 to about 70 percent by weight acrylic acid or methacrylic acid copolymerized with acrylamide or methacrylamide, and mixtures thereof.

3. The method recited in claim 2 wherein the alpha-hydroxy acid is selected from the group consisting of lactic acid, glycolic acid and mixtures thereof.

4. The method recited in claim 3 wherein the amine compound is selected from the group consisting of di-ethanolamine, tri-ethanolamine, dimethylethanolamine, and mixtures thereof.

5. The method recited in claim 4 wherein the zirconium compound is zirconium oxychloride.

6. The method recited in claim 5 wherein the crosslinking composition comprises about 1 mole of zirconium metal ion, about 2 to about 5 moles of the alpha-hydroxy acid, and about 1 to 5 moles of the amine compound.

7. The method recited in claim 6 wherein crosslinking composition further comprises an ingredient selected from the group consisting of citric acid, malic acid, and mixtures thereof, and said ingredient is present in the range of about 0.25 moles to about 2 moles for 1 mole of zirconium metal ion.

8. The method recited in claim 6 wherein said crosslinking composition is present in the range of from about 1.0 to about 100.0 parts by weight of the polymer.

9. The method recited in claim 8 wherein said polymer is present in the range of from about 0.0025 to about 5.0 weight percent of water.

10. The method recited in claim 9 wherein said polymer is selected from the group consisting of polyacrylamide wherein 7 percent of the carboxamide groups are hydrolyzed to carboxyl groups, polyacrylamide wherein 30 percent of the carboxamide groups are hydrolyzed to carboxyl groups, and mixtures thereof.

11. A method of altering the permeability of a subterranean formation comprising:
sequentially contacting the formation with
a. a first aqueous mixture comprising a water dispersible hydrophilic organic polymer having a molecular weight of at least 100,000 and containing carboxyl functionality;
b. a crosslinking composition comprising
(1) water;
(2) a xirconium compound selected from the group consisting of zirconium oxychloride, zirconium acetate, zirconium ortho-sulfate, zirconium tetrachloride, zirconium carbonate, zirconium ammonium carbonate, and mixtures thereof;
(3) an alpha-hydroxy acid represented by the following formula:

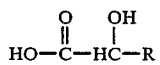

wherein R is selected from the group consisting of hydrogen and an alkyl group having 1 to about 3 carbon atoms; and,
(4) an amine compound represented by the formula:

wherein:
$R_1$ is a hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms; and,
$R_3$ is selected from the group consisting of hydrogen, an alkyl group having 1 to about 3 carbon atoms and a hydroxyalkyl group having 1 to about 3 carbon atoms; and,
c. a second aqueous mixture comprising a water dispersible hydrophilic organic polymer having a molecular weight of at least 100,000 and containing carboxyl functionality.

12. The method recited in claim 11 wherein said water-dispersible organic polymer of the first and second mixture is selected from the group consisting of carboxyalkyl guar wherein the alkyl group has 1 to about 3 carbon atoms, carboxyalkylhydroxyalkyl guar wherein the alkyl groups have 1 to about 3 carbon atoms, xanthan gum, polyacrylamide wherein about 5 to about 75 percent of the carboxamide groups are hydrolyzed to carboxyl groups, polymethacrylamide wherein about 5 to about 75 percent of the carboxamide groups are hydrolyzed to carboxyl groups, cellulose ethers, a copolymer of about 5 to about 70 percent by weight acrylic acid or methacrylic acid copolyerized with acrylamide or methacrylamide, and mixtures thereof.

13. The method recited in claim 12 wherein the alpha-hydroxy acid is selected from the group consisting of lactic acid, glycolic acid and mixtures thereof.

14. The method recited in claim 13 wherein the amine compound is selected from the group consisting of di-ethanolamine, tri-ethanolamine, dimethylethanolamine, and mixtures thereof.

15. The method recited in claim 14 wherein the zirconium compound is zirconium oxychloride.

16. The method recited in claim 15 wherein the complexing composition comprises about 1 mole of zirconium metal ion, about 2 to about 5 moles of the alpha-hydroxy acid, and about 1 to 5 moles of amine compound.

17. The method recited in claim 16 wherein crosslinking composition further comprises an ingredient selected from the group consisting of citric acid, malic acid, and said ingredient is present in the range of about 0.25 moles to about 2 moles for 1 mole of zirconium metal ion.

18. The method recited in claim 16 wherein said crosslinking composition is present in the range of from about 1.0 to about 100.0 parts by weight of the polymer.

19. The method recited in claim 18 wherein said polymer of said first and second mixtures is present in the range of from about 0.0025 to about 5.0 weight percent of water.

20. The method recited in claim 19 wherein said polymer of said first and second mixtures is selected from the group consisting of polyacrylamide where 7 percent of the carboxamide groups are hydrolyzed to carboxyl groups, polyacrylamide wherein 30 percent of the carboxamide groups are hydrolyzed to carboxyl groups and mixtures thereof.

* * * * *

UNITED STATES PATENT AND TRADEMARK OFFICE
CERTIFICATE OF CORRECTION

PATENT NO. : 4,524,829
DATED : June 25, 1985
INVENTOR(S) : David J. Hanlon / Stephen W. Almond It is certified that error appears in the above-identified patent and that said Letters Patent is hereby corrected as shown below:

Column 11, at line 33, delete the formula "$MgCl_2 \cdot 6H_2$" and insert therefore --$MgCl_2 \cdot 6H_2O$--.

Signed and Sealed this

Eighth Day of October 1985

[SEAL]

Attest:

DONALD J. QUIGG

Attesting Officer

Commissioner of Patents and Trademarks—Designate